July 7, 1970

D. E. BLUE 3,518,909

PORTABLE BAND SAW

Filed Oct. 2, 1967

INVENTOR,
DONALD E. BLUE

BY *Jacobi & Davidson*

ATTORNEYS

July 7, 1970          D. E. BLUE          3,518,909
PORTABLE BAND SAW
Filed Oct. 2, 1967          2 Sheets-Sheet 2
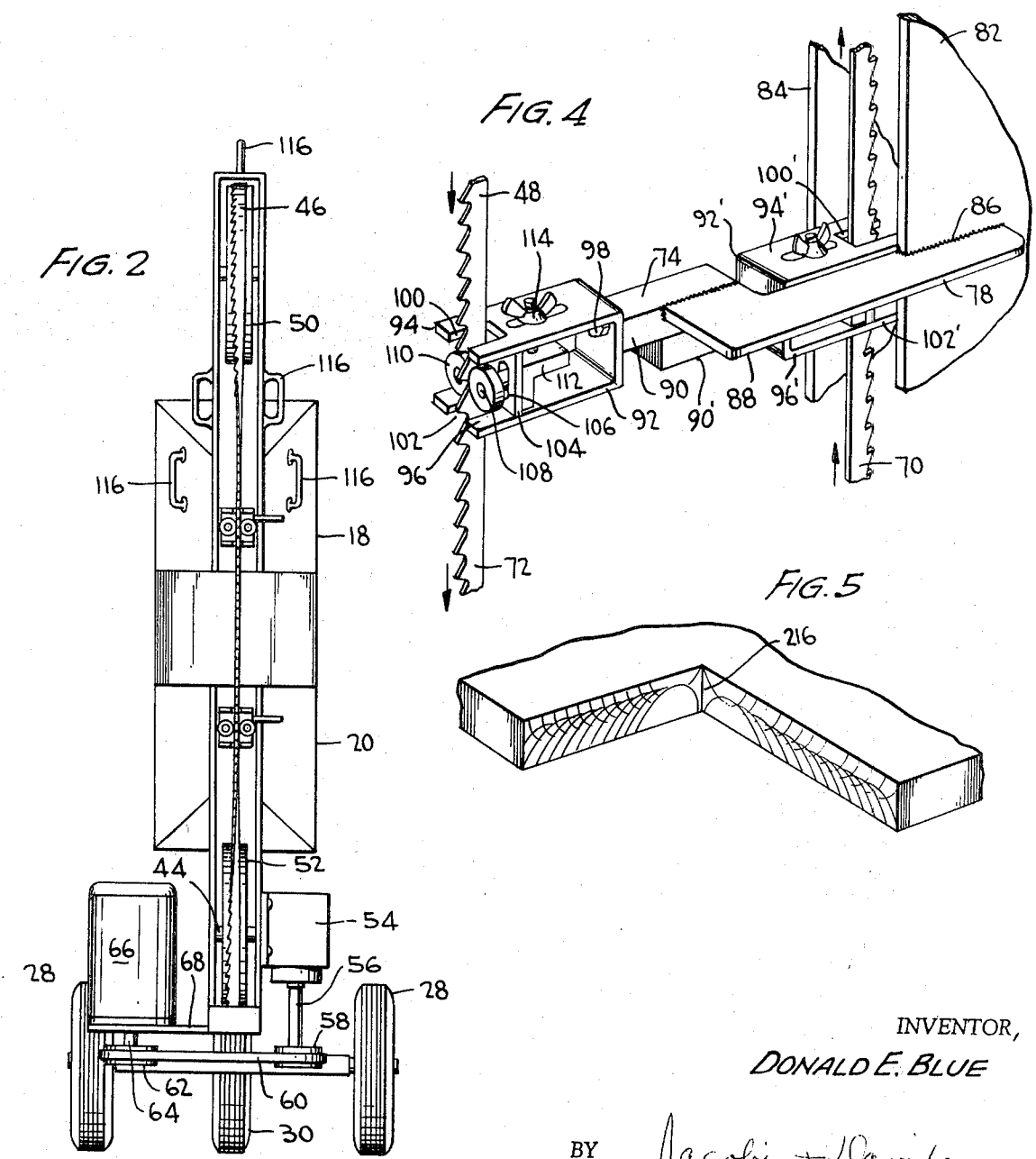
INVENTOR,
DONALD E. BLUE
BY Jacobi + Davidson
ATTORNEYS United States Patent Office 3,518,909
Patented July 7, 1970

3,518,909
PORTABLE BAND SAW
Donald E. Blue, 1717 6th St. NW.,
Albuquerque, N. Mex. 87107
Filed Oct. 2, 1967, Ser. No. 672,212
Int. Cl. B26d 1/46
U.S. Cl. 83—201.04                                11 Claims

ABSTRACT OF THE DISCLOSURE

A portable band saw for completing cuts made in an article by a circular saw that leaves uncut corners and comprises a frame for supporting a driving pulley and an idler pulley about which a saw band extends; the saw frame supports a pair of front guide means and a pair of rear guide means that twist sections of the front travelling portion of the saw band and sections of the rear travelling portion of the saw band so that these sections lie in the same plane and in the plane of a thin guide element that is mounted on the frame and extends rearwardly from the saw band. The arrangement is such that both the section of the rear travelling portion of the saw band and the thin guide element enter the cut in an article made by a section of the front travelling portion of the saw band.

---

The present invention relates to band saws and particularly to portable band saws characterized in that the cutting plane of the band of the band saw may be turned through an angle of ninety degrees.

In the merchandising of thick metal plate stock, such as aluminum plate stock, large sheets of plate stock are customarily stored in piles in warehouses. Due to space considerations, such piles of plate stock are generally placed relatively close to each other. Difficulty, for that reason, in the handling of such plate stock, presents a continuing problem, particularly when the customer's requirements are less than an entire plate of stock and a plate thereof must be removed from a pile and transported for cutting to a saw which has a fixed location substantially removed from the pile from which the plate of stock was removed.

The cutting operation is usually carried out, in part, by the use of a circular saw since such saws are particularly adapted for cutting through thick metal stock. However, when circular saws are employed to cut out pieces of a size smaller in both length and width than the stock plate, the circular saw must make cuts which intersect at an angle to each other. Because of the circular configuration of said saws, they leave at the junction or inside corner of the stock plate an uncut portion. Likewise, when very thick plates of stock are cut with a circular saw, it is often necessary that the cuts be made from both the top and from the bottom of the stock plate. This, too, causes an uncut portion to remain that must be cut away by other means such as a hand saw. In some localities, in order to avoid the time and effort required to cut away this uncut portion with a hand saw, it has been the practice to first cut off from the stock plate, with a circular saw, a strip of the desired width. The strip is then again cut, with a circular saw, in a direction at right angles to the first cut, to the desired length. With this method, a strip of stock of the desired length may be removed from the stock plate, but that portion of the strip which remains after cutting off the desired length becomes waste to the distributor for which the customer is ultimately charged.

Taking into consideration the foregoing deficiencies, it is the primary object of the present invention to overcome such deficiencies and, moreover, to bring about other advantages not generally possible with existing band saws.

Another object of the invention is to provide such a band saw with a portable frame so that the saw may be moved into the material being cut and also so that it will be unnecessary to transport the stock plate to a fixed location when it must be cut. In order to reduce the effort required to move the band saw frame from place to place, it is provided with wheels. A single wheel is pivotally mounted centrally adjacent one end of the frame in order to enable the frame to be turned around within a small turning radius.

Yet another object of the invention is to provide a band saw having guide means that engage the blade and make it possible for sections of the front travelling portion of the band and sections of the rear travelling portion band to lie in the same vertical plane. Such guide means contact both faces of the band saw and are located at the rear travelling portion of the band saw as well as at the front traveling portion so that a section of the rear travelling portion can enter into the cut previously made by the front travelling portion of the band saw.

Still another object of the invention is to provide a band saw in which the frame includes a thin fixed longitudinally extending guide member that enters into the cut previously made by a circular saw to guide the band saw as the cutting operation is completed by the band saw.

A further object of the invention is to provide a band saw having a frame shaped to provide a throat which has a longitudinal extent that is at least sufficient to allow the band saw to work as deeply into the stock plate as may be required in order to meet maximum cutting conditions.

A still further object of the invention is to design the height of the throat from the floor to the same height as the tables or horses used to support the stock plate so as to eliminate unnecessary handling of the stock.

A still further object of the invention is to provide improvements in a band saw, according to the teachings of the present invention, that are simple in construction, durable and made of materials of relatively low cost.

The invention will be better understood and objects other than those set forth above will become apparent, after reading the following detailed description thereof.

Such description refers to the annexed drawings presenting preferred and illustrative embodiments of the invention.

IN THE DRAWINGS

FIG. 2 is a front view thereof;

FIG. 3 is a sectional view taken on section line 3—3 of the FIG. 1;

FIG. 4 is an enlarged cut-away perspective view of the saw band and cooperating guide means therefor; and FIG. 5 is a perspective view of a stock plate of metal from which a corner has been cut.

DESCRIPTION OF THE PREFERRED EMBODIMENT

Figure 1:
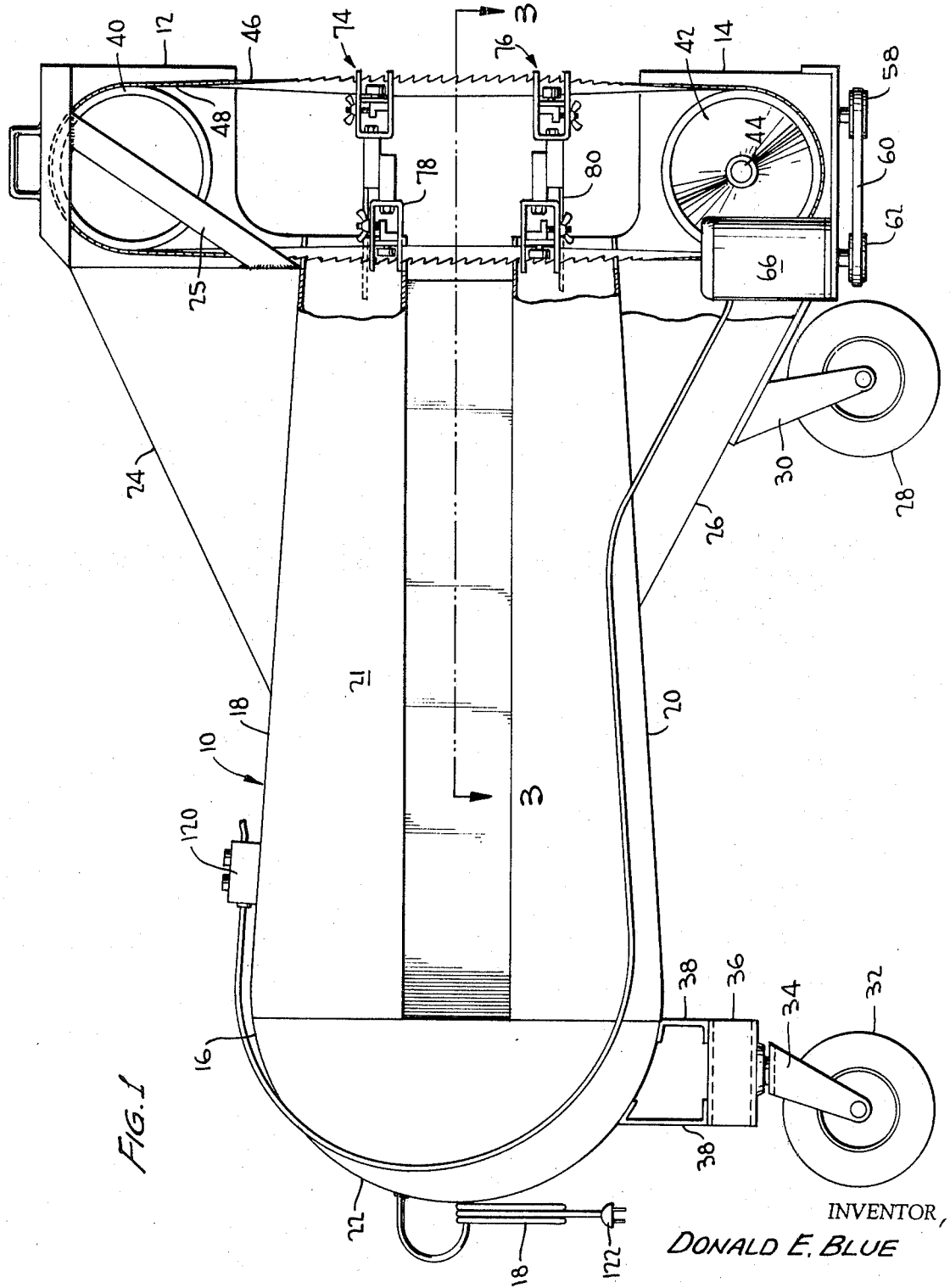
FIG. 1 is a side elevational view of a band saw in accordance with the present invention.

Referring to the drawings, it is to be noted that the device disclosed therein includes a frame indicated generally by the numeral 10. The frame comprises a forwardly positioned upper saw portion 12, a forwardly positioned lower saw portion 14 and a rearwardly extending guide portion 16. The guide portion 16 includes a top section 18, a bottom section 20 and a terminal section 22. The top section 18 is, as shown in FIG. 1, spaced from the bottom section 20 and secured between top section 18 and bottom section 20, for the entire extent of such space, is a thin longitudinally rearwardly extending guide element 21. Upper saw portion 12 is secured to the top section 18 by supporting brace means 24, 25. Similarly, lower saw portion 14 is secured to the bottom section 20 by supporting brace means 26.

A pair of wheels 28, 28 mounted on arms 30, which depend from supporting brace means 26, portably supports the forward end of the frame 10.

A frame guide wheel 32 is mounted on a depending arm 34 which in turn is carried by a rotatable support mechanism 36 that is supported from terminal section 22 by brackets 38. Although a specific arrangement is disclosed for effecting a turning movement of the rear portion of the frame 10, it is to be understood that other equivalent constructions for portably supporting and turning the rear of the frame are within the scope of the present invention.

An upper pulley 40 is rotatably supported by a shaft (not shown) which is vertically adjustable, in any conventional manner, on upper saw portion 12. A similar lower pulley 42 is rotatably supported by lower saw section 14 and it is arranged to lie in the same vertical plane as upper pulley 40. Moreover, the shaft 44 upon which it is mounted, is located directly below the shaft of pulley 40. The adjustability of the shaft for pulley 40 facilitates installation and tightening of a saw band 46 associated with said pulley.

A continuous saw band 46 extends around upper and lower pulleys 40 and 42 and has an inner face 48 in contacting relation with the peripheral surfaces 50, 52, respectively, of upper and lower pulleys 40, 42. Shaft 44 is driven by a gear mechanism (not shown) contained in a gear box 54. The gear mechanism has an input shaft 56 that carries a driven pulley 58. Pulley 58 is driven by a belt 60 that is driven by a pulley 62 mounted on the shaft 64 of a motor 66 supported on the frame 10 by a bracket 68. The saw band 46 has a rear travelling portion 70 and a front travelling portion 72. A pair of spaced guide means 74, 76 mounted on frame 10 is arranged to be associated with the front travelling portion 72 of the saw band 46. A similar pair of spaced guides 78, 80 is mounted on the frame 10 and arranged to coact with the rear travelling portion 70 of the saw band 46.

Reference is now made to FIG. 4 wherein the construction of the guide means 74, 78 is shown on an enlarged scale. Since the construction and manner of mounting of guide means 76, 80 is similar to that of guide means 74, 78, a description of guide means 74, 78 and the mounting thereof on the frame 10 is thought to be sufficient for an understanding of the construction and mounting of guide means 76, 80 for the rear travelling portion of saw band 46.

Upper saw portion 12 includes a pair of spaced parallel downwardly extending frame members 82, 84. Secured to frame member 82, by any suitable means, such as welding as shown at 86, and extending outwardly therefrom, is a support plate 88. Similarly secured to support plate 88, by welding or other conventional means, and extending outwardly from support plate 88, is a support bar 90. A U-shaped element 92 having outwardly extending upper and lower legs 94, 96 is secured to support bar 90 by any suitable means such as a bolt 98. Upper leg 94 is provided with a cut-out portion 100 and lower leg 96 is provided with a cut-out portion 102. Cut-out portions 100 and 102 are arranged to receive, for movement therethrough, the front travelling portion 72 of saw band 46.

Similarly, mounted on support bar 90 by welding or otherwise, is a support bar 90'. Secured to support bar 90' by a bolt (not shown), in a U-shaped element 92' having inwardly extending upper and lower legs 94' and 96'. Upper leg 94' is provided with a cut-out portion 100' and lower leg 96' is provided with a cut-out portion 102'. Cut-out portions 100' and 102' are arranged to receive, for movement therethrough, the rear travelling portion 70 of saw band 46.

A guide plate 104 having a pair of vertically extending guide grooves 106 (only one of which is shown in FIG. 4 of the drawings), is secured between upper and lower legs 94, 96 of U-shaped element 92. Extending, respectively, through each of the guide grooves 106, 106 are the shafts 108, 108 of guide rollers 110, 110 which are supported on a right angular shaped mounting member 112. Mounting member 112 is threadedly mounted on a bolt that terminates in a wing nut 114. On rotation of the wing nut 114, the mounting bracket, and consequently the rollers 110, 110 may be vertically adjusted along the saw band 46.

The frame 10 of the band saw is provided with conveniently located hand holds 116 which make it possible to move the band saw from place to place.

Electric power is provided for the electric motor 66 by means of an electric cord 118 which is provided with switch 120 and plug 122.

Atlhough the accompanying drawings show an arrangement wherein the front portion of the saw band 46 travels in a downward direction, it is to be understood that the saw band could, if desired, be arranged to operate in the usual manner, that is with the front portion of the saw band 46 travelling in an upward direction.

When it is desired to cut a piece of stock to a given length and width from a larger plate of stock, a circular saw is first employed and operated in a manner to make cuts in the plate of stock along lines at right angles to each other, except for a corner of stock which remains, as shown in FIG. 5 at 116, due to the contour of the circular saw, a sheet of stock of the required size As previously described, this remaining corner has, in the past, been removed by the tedious and costly use of a hand saw. Where a band saw according to the present invention is available, the need for a hand sawing operation is entirely eliminated. After cuts have been made by a circular saw in directions at right angles to each other, as far as possible, without cutting beyond a distance commensurate with the size of the piece of material to be removed from the larger plate of stock, thus leaving a corner 216, the portable band saw of the present invention is brought into use. The plate of stock having the cuts made by the circular saw, is fed to the band saw in a manner so that as the band saw is moved into the stock plate, the front portion of the saw band 46 enters into the cut previously made by the circular saw. The band saw is then moved forward an additional amount so that the rear portion of the saw band enters into the cut made by the circular saw and the front portion of the saw blade also enters into the cut made by the circular saw. Further forward movement of the band saw causes the guide element 21 to enter into the cut made by the circular saw and accurately guides the saw as its forward movement is continued to effect the partial removal of the uncut corner 216. The band saw is then removed from the stock plate which is then turned through an angle of ninety degrees and the previously described operation is repeated in order to complete the cutting away of the portion of the corner 216 which remains after the first cut has been made by the band saw.

After reading the foregoing detailed description, it will be apparent that the objects set forth initially have been successfully achieved. Accordingly,

What is claimed is:

1. A band saw arrangement comprising a frame; a first pulley mounted on said frame; a second pulley mounted on said frame, lying in the same vertical plane and directly above said first pulley; a continuous saw band, having opposed faces, a cutting edge and a back edge, extending about said pulleys and arranged, upon being driven, to provide a first front traveling portion and a second gear traveling portion; a first pair of vertically spaced guide means mounted on said frame between said pulleys, each guide means of said first pair of guide means being in engagement with the opposed faces of the front traveling portion of said saw band and arranged so that said front traveling portion of said band is twisted between each pulley and the respectively adjacent guide means of said first pair of guide means so that the entire extent of said saw band between said first pair of guide means is made to travel in a plane parallel to the plane of the pulleys; a second pair of vertically spaced guide means mounted on said frame between said pulleys; each guide means of said second pair of guide means being in engagement with opposed faces of the rear traveling portion of said saw band and arranged so that said rear traveling portion of said band is twisted between each pulley and the respectively adjacent guide means of said second pair of guide means so that the entire extent of said saw band between said second pair of guide means is made to travel in a plane parallel to the vertical plane of the pulleys and coinciding with said first vertical plane and with its back edge facing the back edge of the front traveling portion, whereby the second rearward traveling portion of the band may be caused to enter a cut formed in an article while the first front traveling portion of the band extends the cut.

2. A band saw as defined in claim 1 wherein each of said guide means comprises a roller means in engagement with the opposed faces of the saw band.

3. A band saw as defined in claim 2 wherein the roller means are mounted on said frame for vertical adjustment relative to said frame.

4. A band saw as defined in claim 1 wherein each of said guide means comprises two rollers, one in engagement with each face of said saw band.

5. A band saw as defined in claim 1 wherein said frame is cut away for a substantial distance rearwardly of said rear travelling portion of said saw band in a horizontal direction so as to provide a throat, thereby to permit an article being cut to project a substantial distance rearwardly beyond said rear travelling portion of said saw band.

6. A band saw as defined in claim 1 wherein said frame includes a plurality of wheels to make it portable and to provide a means for moving the saw into the material being cut.

7. A band saw arrangement comprising a frame; a first pulley mounted on said frame; a second pulley mounted on said frame, lying in the same vertical plane and directly above said first pulley; a continuous saw band, having opposed faces, extending about said pulleys and arranged, upon being driven, to provide a first front travelling portion and a second rear travelling portion; a first pair of vertically spaced guide means mounted on said frame, each guide means of said first pair of guide means being in engagement with the opposed faces of the front travelling portion of said saw band and arranged so that the faces of said front travelling portion of said band between said first pair of guide means may be made to travel in a plane parallel to the plane of the pulleys; a second pair of vertically spaced guide means mounted on said frame; each guide means of said second pair of guide means being in engagement with opposed faces of the rear travelling portion of said saw band and arranged so that the opposed faces of said rear travelling portion of said band between said pair of guide means may be made to travel in a plane parallel to the vertical plane of the pulleys and coinciding with said first vertical plane, whereby the second rearward travelling portion of the band may be caused to enter a cut formed in an article while the first front travelling portion of the band extends said cut, said frame being cut away for a substantial distance rearwardly of said rear travelling portion of said saw band in a horizontal direction so as to provide a throat, thereby to permit an article being cut to project a substantial distance rearwardly beyond said rear travelling portion of said saw band and said frame further including a rearwardly extending thin vertical guide element positioned to enter into a cut made in an article when said article projects rearwardly beyond said rear travelling portion of said saw band.

8. A band saw arrangement comprising a frame; a first pulley mounted on said frame; a second pulley mounted on said frame, lying in the same vertical plane and directly above said first pulley; a continuous saw band, having opposed faces, extending about said pulleys and arranged, upon being driven, to provide a first front travelling portion and a second rear travelling portion; a first pair of vertically spaced guide means mounted on said frame, each guide means of said first pair of guide means being in engagement with the opposed faces of the front travelling portion of said saw band and arranged so that the faces of said front travelling portion of said band between said first pair of guide means may be made to travel in a plane parallel to the plane of the pulleys; a second pair of vertically spaced guide means mounted on said frame; each guide means of said second pair of guide means being in engagement with opposed faces of the rear travelling portion of said saw band and arranged so that the opposed faces of said rear travelling portion of said band between said pair of guide means may be made to travel in a plane parallel to the vertical plane of the pulleys and coinciding with said first vertical plane, whereby the second rearward travelling portion of the band may be caused to enter a cut formed in an article while the first front travelling portion of the band extends said cut and said frame including a rearwardly extending thin vertical guide element positioned to enter into a cut made in an article when said article projects rearwardly beyond said rear travelling portion of said saw band.

9. A band saw arrangement comprising a frame; a first pulley mounted on said frame; a second pulley mounted on said frame, lying in the same vertical plane and directly above said first pulley; a continuous saw band, having opposed faces, extending about said pulleys and arranged, upon being driven, to provide a first front travelling portion and a second rear travelling portion; a first pair of vertically spaced guide means mounted on said frame, each guide means of said first pair of guide means being in engagement with the opposed faces of the front travelling portion of said saw band and arranged so that the faces of said front travelling portion of said band between said first pair of guide means may be made to travel in a plane parallel to the plane of the pulleys; a second pair of vertically spaced guide means mounted on said frame; each guide means of said second pair of guide means being in engagement with opposed faces of the rear travelling portion of said saw band and arranged so that the opposed faces of said rear travelling portion of said band between said pair of guide means may be made to travel in a plane parallel to the vertical plane of the pulleys and coinciding with said first vertical plane, whereby the second rearward travelling portion of the band may be caused to enter a cut formed in an article while the first front travelling portion of the band extends said cut, each guide means comprising two rollers, one in engagement with each face of the saw band, mounted on said frame for vertical adjustment relative to said frame; said frame being cut away a substantial distance rearwardly of said rear travelling portion of said saw band in a horizontal direction so as to permit an article being cut to project a substantial distance rearwardly beyond said rear travelling portion of said saw band; a rearwardly extending thin vertical guide element positioned to enter into a cut made in an article when said article projects rearwardly beyond said rear travelling portion of said saw band; a plurality of wheels mounted on the forward portion of the frame, and a centrally located pivotally mounted wheel at the rear of the frame.

10. A band saw arrangement comprising a frame; a first pulley mounted on said frame; a second pulley mounted on said frame, lying in the same vertical plane and directly above said first pulley; a continuous saw band, having opposed faces, extending about said pulleys and arranged, upon being driven, to provide a first front travelling portion and a second rear travelling portion; a first pair of vertically spaced guide means mounted on said frame, each guide means of said first pair of guide means being in engagement with the opposed faces of the front travelling portion of said saw band and arranged so that the faces of said front travelling portion of said band between said first pair of guide means may be made to travel in a plane parallel to the plane of the pulleys; a second pair of vertically spaced guide means mounted on said frame; each guide means of said second pair of guide means being in engagement with opposed faces of the rear travelling portion of said saw band and arranged so that the opposed faces of said rear travelling portion of said band between said pair of guide means may be made to travel in a plane parallel to the vertical plane of the pulleys and coinciding with said first vertical plane, whereby the second rearward travelling portion of the band may be caused to enter a cut formed in an article while the first front travelling portion of the band extends said cut, each guide means comprising two rollers, one in engagement with each face of the saw band, mounted on said frame for vertical adjustment relative to said frame; said frame being cut away a substantial distance rearwardly of said rear travelling portion of said saw band in a horizontal direction so as to permit an article being cut to project a substantial distance rearwardly beyond said rear travelling portion of said saw band; a rearwardly extending thin vertical guide element positioned to enter into a cut made in an article when said article projects rearwardly beyond said rear travelling portion of said saw band.

11. A portable band saw comprising the combination of a wheeled frame, said frame including vertically spaced upper and lower arm means, housing means above and including at least a portion disposed forwardly of said upper arm means, further housing means below and including at least a portion disposed forwardly of said lower arm means, a first pulley means supported within said first housing means with its axis transverse to the direction of extent of said arm means, a second pulley means supported within said further housing means and disposed in at least approximate vertical alignment with said first pulley means, a continuous band saw having opposed faces, a cutting edge and a back edge, said band saw being trained around said first and second pulley means with one face of said band saw engaging both pulley means, means carried by said frame for driving one of said pulley means to thereby drive said band saw to provide front and rear traveling portions extending across the space between said arm means, said arm means having a horizontal extent at least twice the diameter of said pulley means so as to define a deep throat extending rearwardly of the rear traveling portion of said band saw, a first pair of horizontally spaced guide means carried by said upper arm means and engaging the opposite faces of said band saw above said throat, a second pair of horizontally spaced guide means carried by said lower arm means and engaging the opposite faces of said band saw below said throat, all said guide means including surfaces which cooperate to impart twist to those portions of the traveling band saw extending between the respective pulley means and guide means so as to dispose the opposite faces of the front and rear traveling portions of the band saw transverse to the axes of said pulley means so that they travel across said throat in coincidence with a path of cut extended into a workpiece by said front traveling portion with said rear traveling portion entering such a cut and with the back edge of the rear traveling portion facing the back edge of the front traveling portion and said throat accommodating a substantial extent of a workpiece to enable relative forward motion of said frame to effect a long movement of said band saw relative to a workpiece.

References Cited

UNITED STATES PATENTS 2,928,439    3/1960    Tester _____ 83—201.04 X

FOREIGN PATENTS 12,233    5/1911    Great Britain.
529,261    7/1931    Germany.

WILLIAM S. LAWSON, Primary Examiner

J. F. COAN, Assistant Examiner

U.S. Cl. X.R.

83—201.15; 143—17, 160